(12) United States Patent
Munoz Ruiz (10) Patent No.: US 8,936,020 B1
(45) Date of Patent: Jan. 20, 2015

(54) SOLAR FLUIDS PREHEATING SYSTEM WITH LOW THERMAL LOSSES

(71) Applicant: Fricaeco America, SAPI de C.V., Nuevo Leon (MX)

(72) Inventor: Andres Munoz Ruiz, Nuevo Leon (MX)

(73) Assignee: Fricaeco America SAPI de C.V., Nuevo Leon (MX)

( * ) Notice: Subject to any disclaimer, the term of this patent is extended or adjusted under 35 U.S.C. 154(b) by 0 days.

(21) Appl. No.: 14/205,722

(22) Filed: Mar. 12, 2014

(51) Int. Cl.
| F24J 2/00 | (2014.01) |
| F24J 2/34 | (2006.01) |
| F24J 2/44 | (2006.01) |
| F24J 2/50 | (2006.01) |

(52) U.S. Cl.
CPC .. F24J 2/345 (2013.01); F24J 2/44 (2013.01); F24J 2/50 (2013.01)
USPC .............................. 126/714; 126/640; 220/721

(58) Field of Classification Search
CPC ............. F24J 2/44; F24J 2/345; F24J 2/0488; F24J 2/07; Y02E 10/40; Y02E 60/142; F24D 17/0021; F24D 3/082; F24D 20/0039; F24H 1/122; F24H 9/124; F24H 9/2021; Y02B 10/20
USPC ............. 126/714, 640, 610; 138/30; 220/721; 122/19.2, 13.01; 392/451
See application file for complete search history.

(56) References Cited

U.S. PATENT DOCUMENTS

| | | | | |
|---|---|---|---|---|
| 2,487,947 | A * | 11/1949 | Senn .............................. | 60/531 |
| 3,769,493 | A * | 10/1973 | Zeitlin et al. ................... | 392/503 |
| 4,015,586 | A * | 4/1977 | Vroom et al. .................. | 126/587 |
| 4,086,958 | A * | 5/1978 | Lindner et al. .................. | 165/10 |
| 4,294,310 | A * | 10/1981 | Reusch et al. ............ | 165/104.13 |
| 4,328,790 | A * | 5/1982 | Kircus .......................... | 126/624 |
| 4,333,448 | A * | 6/1982 | Johnson ........................ | 126/714 |
| 4,371,028 | A * | 2/1983 | Helshoj .......................... | 165/10 |
| 4,416,257 | A * | 11/1983 | Bale .............................. | 126/610 |
| 4,485,802 | A * | 12/1984 | Babcock ........................ | 126/563 |
| 4,485,804 | A * | 12/1984 | Sharpe .......................... | 126/625 |
| 4,519,380 | A * | 5/1985 | Laing ............................ | 126/583 |
| 4,893,611 | A * | 1/1990 | Kleinwachter ................ | 126/586 |
| 5,499,621 | A * | 3/1996 | Trihey .......................... | 122/17.1 |
| 5,575,276 | A * | 11/1996 | Fossum et al. ................. | 126/588 |
| 6,370,328 | B1 * | 4/2002 | Mottershead ................. | 392/452 |
| 7,726,263 | B2 * | 6/2010 | Ben-Ishai ................... | 122/20 R |
| 2007/0227468 | A1 * | 10/2007 | Gordon et al. ............. | 122/13.01 |
| 2007/0227532 | A1 * | 10/2007 | Mehler .......................... | 126/640 |
| 2010/0199980 | A1 * | 8/2010 | Ricci et al. .................... | 126/704 |
| 2011/0024080 | A1 * | 2/2011 | Bose et al. ...................... | 165/71 |
| 2011/0197878 | A1 * | 8/2011 | Kuffer ......................... | 126/624 |
| 2011/0247572 | A1 * | 10/2011 | Smith et al. ................... | 122/19.1 |
| 2011/0271953 | A1 * | 11/2011 | Wortmann et al. ............ | 126/619 |
| 2012/0024499 | A1 * | 2/2012 | Chang et al. ............. | 165/104.25 |
| 2012/0097152 | A1 * | 4/2012 | Colson ......................... | 126/619 |

(Continued)

FOREIGN PATENT DOCUMENTS

| WO | 2007112231 | A2 | 10/2007 |
| WO | 2012108752 | A1 | 8/2012 |
| WO | 2013153420 | A1 | 10/2013 |

*Primary Examiner* — Kenneth Rinehart
*Assistant Examiner* — Jason Lau
(74) *Attorney, Agent, or Firm* — Westman, Champlin & Koehler, P.A.; Donika P. Pentcheva (57) ABSTRACT

Some embodiments of the invention relate to a solar preheater having a central body, which includes a base and an outer cover, wherein the base is arranged to receive the outer cover. The solar preheater includes a first thermal collection mechanism and a second thermal collection mechanism.

12 Claims, 10 Drawing Sheets

(56) References Cited

U.S. PATENT DOCUMENTS

| | | | |
|---|---|---|---|
| 2012/0211002 A1* | 8/2012 | Humphreys | 126/640 |
| 2012/0234312 A1* | 9/2012 | Nakatani | 126/651 |
| 2012/0291772 A1* | 11/2012 | Atarashiya et al. | 126/663 |
| 2013/0047610 A1* | 2/2013 | Penton | 60/641.11 |
| 2014/0030555 A1* | 1/2014 | Winkler | 429/2 |

* cited by examiner

SOLAR FLUIDS PREHEATING SYSTEM WITH LOW THERMAL LOSSES

BACKGROUND

The discussion below is merely provided for general background information and is not intended to be used as an aid in determining the scope of the claimed subject matter.

Solar heaters are a good solution for ecologically and cost-effectively heating a fluid. However, solar heaters are generally inefficient when it comes to collecting solar radiation used to heat the fluid and holding the heat stored in the fluid when the surrounding temperature is lower, such as, for example, during the hours without light from the sun. Solar heaters typically operate according to the principle of thermosiphoning. Thermosiphoning is a process used to exchange heat from liquids without an external source (such as a mechanical pump), thereby eliminating costs associated with using a pump and simplifying the process of transferring heat. The process of thermosiphoning usually involves the use of water and natural convection, in which fluid motion is not generated by any external source, but only by density differences in the fluid occurring due to temperature gradients. More specifically, because cold water has a higher specific density and is heavier than warm water, cold water will sink down when stored in a water storage tank, causing the warm water to rise towards the top of the water storage tank.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Some embodiments of the invention relate to a solar preheater having a central body, which includes a base and an outer cover, wherein the base is arranged to receive the outer cover. The solar preheater includes a first thermal collection mechanism and a second thermal collection mechanism.

These and various other features will become apparent upon reading the following detailed description and upon reviewing the associated drawings.

BRIEF DESCRIPTION OF THE DRAWINGS

In order to provide a better understanding of aspects of the invention, the following drawings are herein attached.

DETAILED DESCRIPTION OF ILLUSTRATIVE EMBODIMENTS

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices. Such computer readable media and memory for computer programs and software do not include transitory waves or signals.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

It is understood that one or more of the blocks (of the flowcharts and block diagrams) may be implemented by computer program instructions. These program instructions may be provided to a processor circuit, such as a microprocessor, microcontroller or other processor, which executes the instructions to implement the functions specified in the block or blocks through a series of operational steps to be performed by the processor(s) and corresponding hardware components.

Illustrative embodiments of the present disclosure are directed to a solar preheater 100 having a central body 102. In some embodiments, the central body 102 includes a base 104 and an outer cover 106. In some embodiments the base 104 is configured to receive the outer cover 106. In some embodiments, the outer cover 106 is transparent and shaped as a dome having an outer convex shape, which allows for collection of solar radiation (radiant energy emitted by the Sun) during the time of day when sunlight is present. In some embodiments, the outer cover 106 can be self-cleaned using rain water, thereby serving to avoid the build-up of dirt or unwanted materials in the solar preheater 100. In some embodiments, the shape of the outer cover 106 is aerodynamic, which improves stability of the solar preheater 100 should the preheater be subjected to high-speed winds. In the embodiment illustrated in FIG. 1, base 104 is substantially rounded and configured to receive outer cover 106. In one exemplary embodiment, base 104 can be made from an isolating material.

Figure 1:
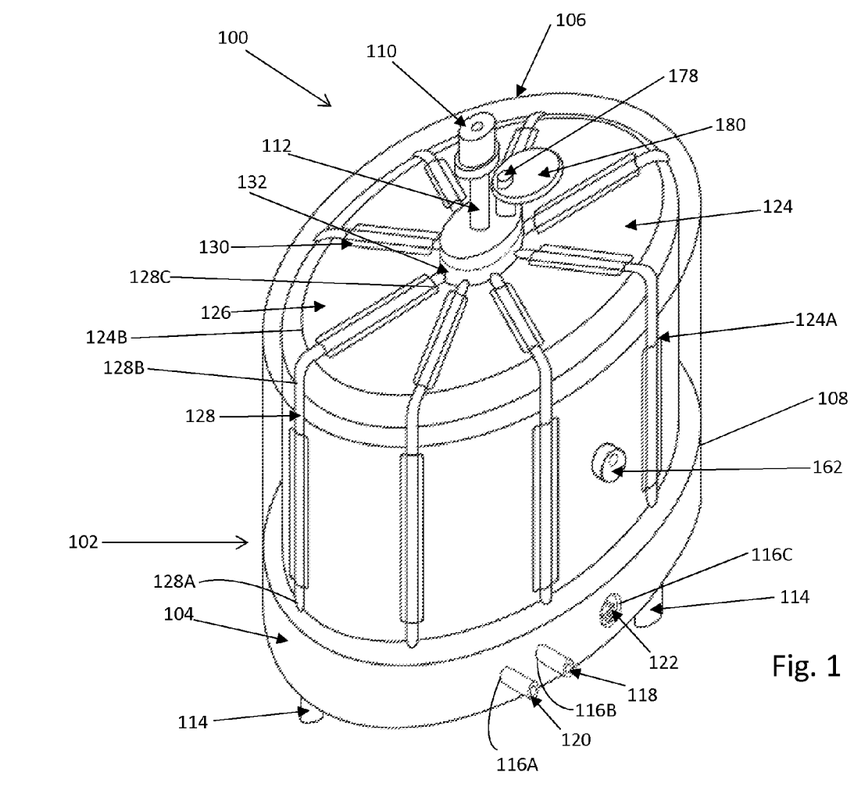
FIG. 1 is a perspective view of a solar preheater in accordance with embodiments of the invention.
Figure 2:
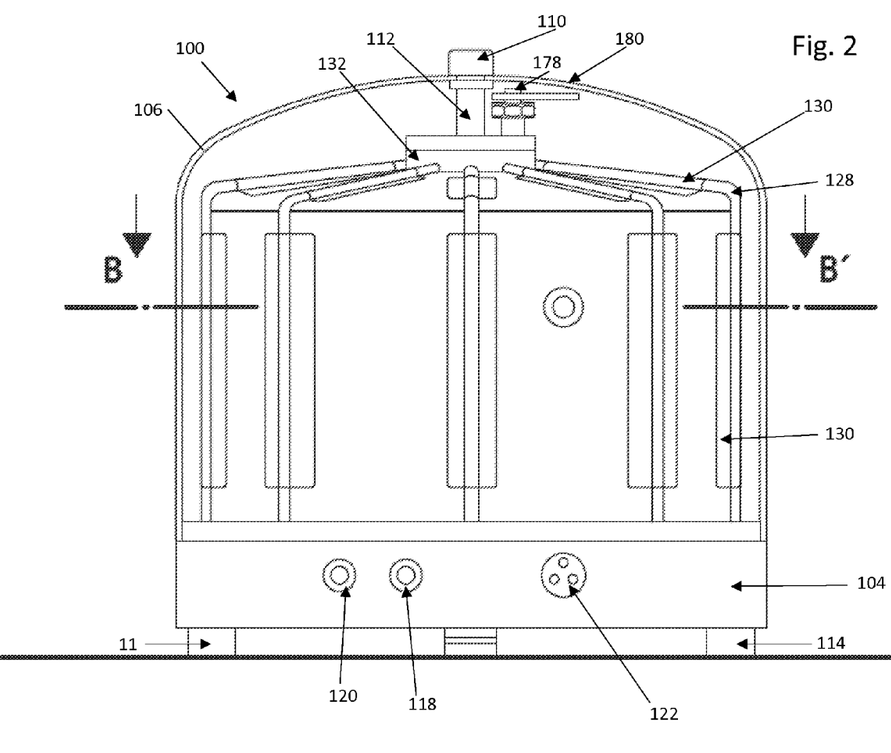
FIG. 2 is a front view of the solar preheater in accordance with embodiments of the invention.
Figure 3:
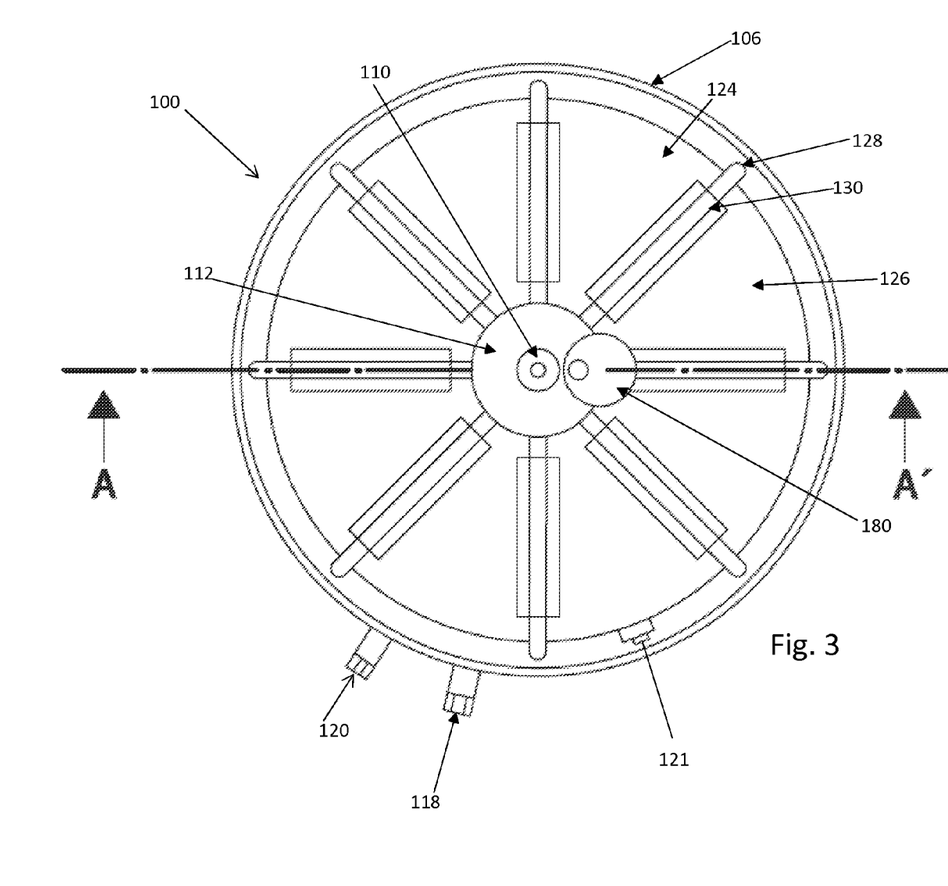
FIG. 3 is a top view of the solar preheater in accordance with embodiments of the invention.

As shown in FIG. 1, solar preheater 100 includes a gasket 108 arranged to provide an air-tight sealing between the outer cover 106 and the base 104. In an alternative embodiment, outer cover 106 can be secured to the base 104 using a transparent silicone paste, or a suitable alternative. The paste can be soft, thereby allowing ease of disassembly of the outer cover 106 from the base 104, as desired.

As further shown in FIG. 1, one or more base supports 114 are used to support the base 104 over the floor, or any other surface configured to support the weight of the solar preheater 100. Base 104 includes openings 116A, 116B, and 116C configured to receive a cold fluid inlet tube 118, a hot fluid outlet tube (or emptying outlet tube) 120, and an electric junction 122, respectively.

Figure 5:
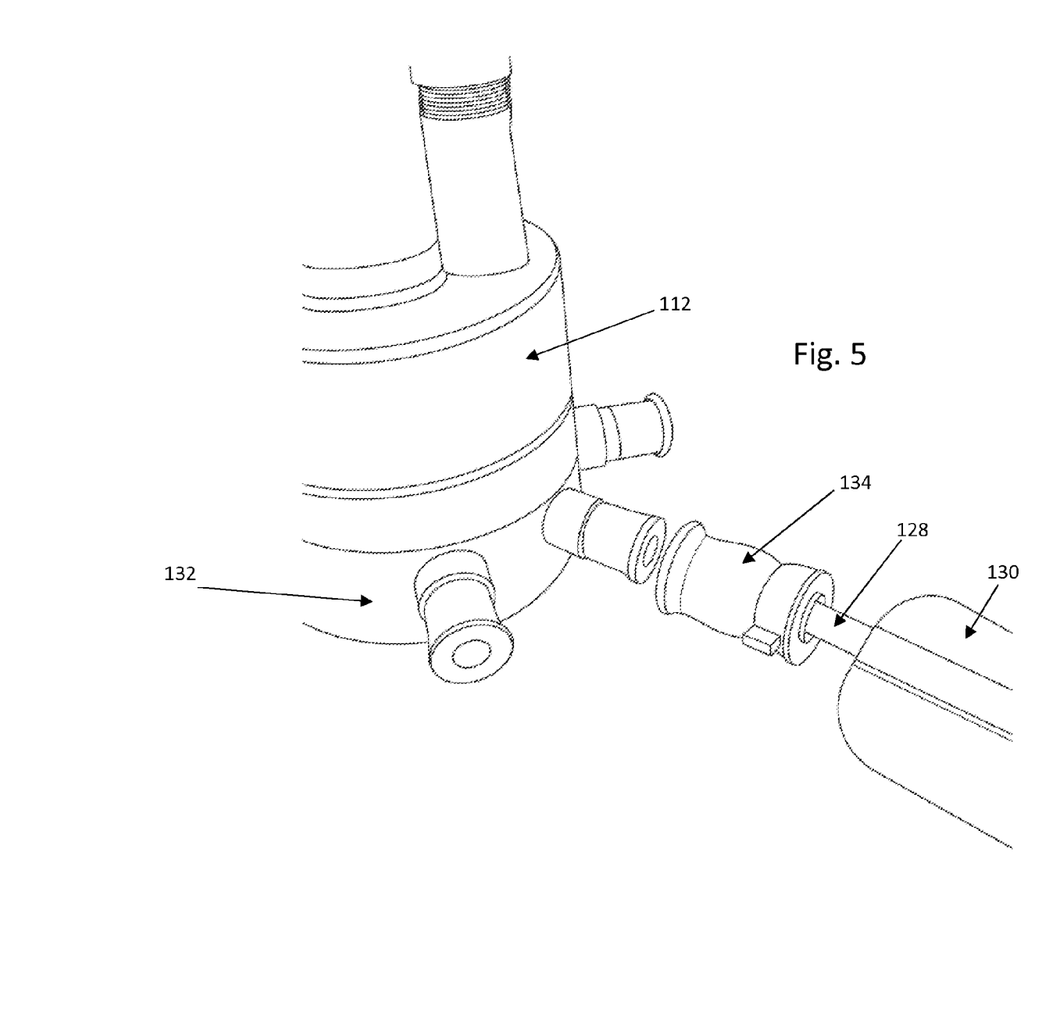
FIG. 5 is a perspective view of a central top collector of the solar preheater in accordance with embodiments of the invention.
Figure 6:
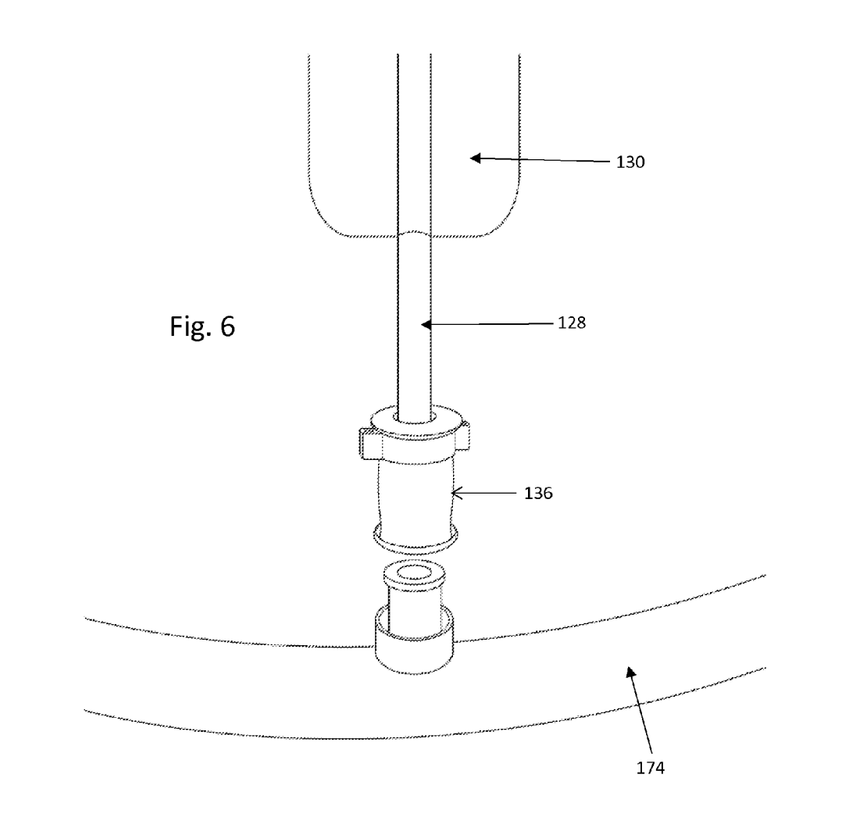
FIG. 6 is a perspective view of a bottom collector tube of the solar preheater in accordance with embodiments of the invention.

In some embodiments, solar preheater 100 includes a solar collector 124 for collecting solar radiation and build-up of hot fluid. The solar collector 124 is supported over the base 104 and is housed in an inner portion of the outer cover 106. According to one example, the solar collector 124 is supported over the base 104 in an air-tight manner. In the illustrative embodiment, the solar collector 124 is shaped as a cylinder. As shown in FIG. 1, solar collector 124 includes a solar collection surface 126 configured to receive a plurality of solar collector tubes 128. According to an exemplary embodiment, the solar preheater 100 can include eight solar collector tubes 128, which can be equally spaced apart from one another in an elliptical configuration. In some embodiments, each solar collector tube 128 has a first end 128A removably attached to the base 104, a body 128B that runs alongside the solar collection surface 126, and a second end 128C removably attached to a central collector 132. The second end 128C of the solar collector tube 128 is connected to the central collector 132 by a connection mechanism 134, shown in FIG. 5. The first end 128A of the solar collector tube 128 is connected to a bottom collector tube 174, situated in the base 104, by a connection mechanism 136, shown in FIG. 6. Connection mechanisms 134, 136 can be formed from a flexible silicone sleeve, or any other suitable connection mechanism.

In some embodiments, the solar collector 124 further includes a first thermal collection mechanism 124A and a second thermal collection mechanism 124B. The first thermal collection mechanism 124A is operated by the transmission of heat directly from a plurality of solar collector ribs 130, wherein each solar collector rib is arranged to latch on each of the plurality of solar collector tube 128 and are arranged between the central body 102 and the outer cover 106. The ribs 130 can be attached to the solar collection surface 126 using a clamp or any other suitable fastening mechanism. In some embodiments, the ribs 130 are formed from a thermally-conductive material, such as, but not limited to, aluminum. In some embodiments, the second thermal collection mechanism 124B works by expanding and contracting the solar collection surface 126. This allows for the bottom portion of solar collector tube 128 and the plurality of solar collector ribs 130 to form or break contact with the solar collection surface 126.

In some embodiments, the solar collector tubes 128 are arranged in order to accelerate the occurrence of the thermosiphon effect. In some embodiments, each of the plurality of solar collector tubes 128 has a first end 128A that is straight and a second end 128B that is curved, as shown in FIG. 1. The first end 128A of the solar collector tube 128 is installed perpendicularly to the base 104. The perpendicular arrangement of the tube 128 allows the solar collector tube 128 to exhibit the least amount of fluid discharge that flows within the first end 128A of the tube 128. It should be noted that this vertical arrangement of the solar collector tubes 128 does not impede movement of the fluid caused by the thermosiphon effect. The curvature of the second end 128B of the solar collection tube 128 improves the thermal transmission caused by the thermosiphon effect by accelerating the upward movement of the flow when the density of the fluid is lower in the second end 128B due to the corresponding temperature increase therein.

Figure 4:
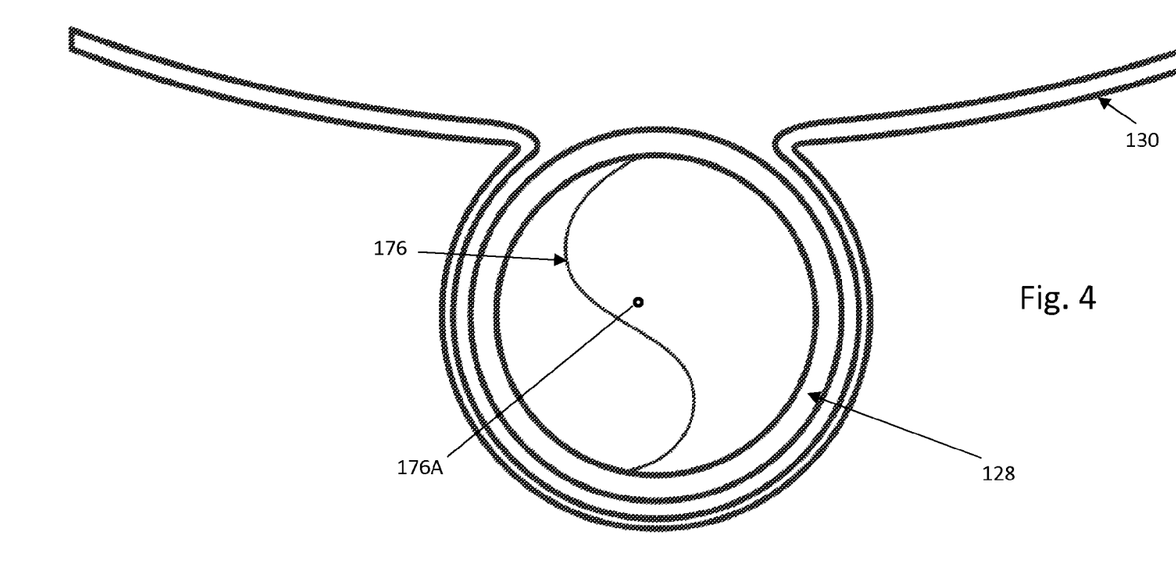
FIG. 4 is a cross-sectional view of a solar collector tube of the solar preheater in accordance with embodiments of the invention.

Having a curve in the second end 128B can reduce the inside diameter of the solar collector tube 128 enough so as to receive an inner deflector 176, shown in FIG. 4. In other words, the inner deflector 176 can be adapted to the curve in the second end 128B of the solar collector tube 128. In some embodiments, the inner deflector 176 can be made from the same material used to make the solar collector tube 128. Using the same material for both the inner deflector 176 and the solar collector tube 128 can increase the contact surface with the liquid that is to be heated, which increases heat transmission and the thermosiphon effect to drive the liquid up through the tube 128 and rotate the liquid, and avoids galvanic corrosion that could be caused by using different materials. In other embodiments, inner deflector can be included in portions of the solar collector tube 128 located above the curve in the second end 128B of the solar collector tube 128.

In some embodiments, the arrangement of the solar collector tubes 128 as shown in the exemplary embodiments improves the efficiency of the solar preheater 100 and the heating rate of water stored in the storage heater tank 144. In particular, the arrangement increases the area of the collection surface 126 of the solar preheater 100 by approximately 30 percent as compared to the collection surface area utilized by solar heaters known in the prior art. Furthermore, the design of the tubes 128 can increase the flow rate in the tube 128. For instance, since the fluid reaches a higher temperature as it approaches the second end 128B of the solar collector tube 128, the fluid has a lower density, which accelerates the flow rate in that portion of the tube 128. The inner deflector 176 drives the fluid flow along a helical path thereby causing movement with angular moment in the flow to occur. This, in turn, causes turbulence in the flow of the fluid that increases the thermal exchange rate between the fluid and the solar collector 124. Thus, in some embodiments, the tubes 128 transition the fluid flow in the second end 128B to switch from a laminar flow to a turbulent flow to increase heat transfer between the fluid and the solar collector 124.

Figure 7:
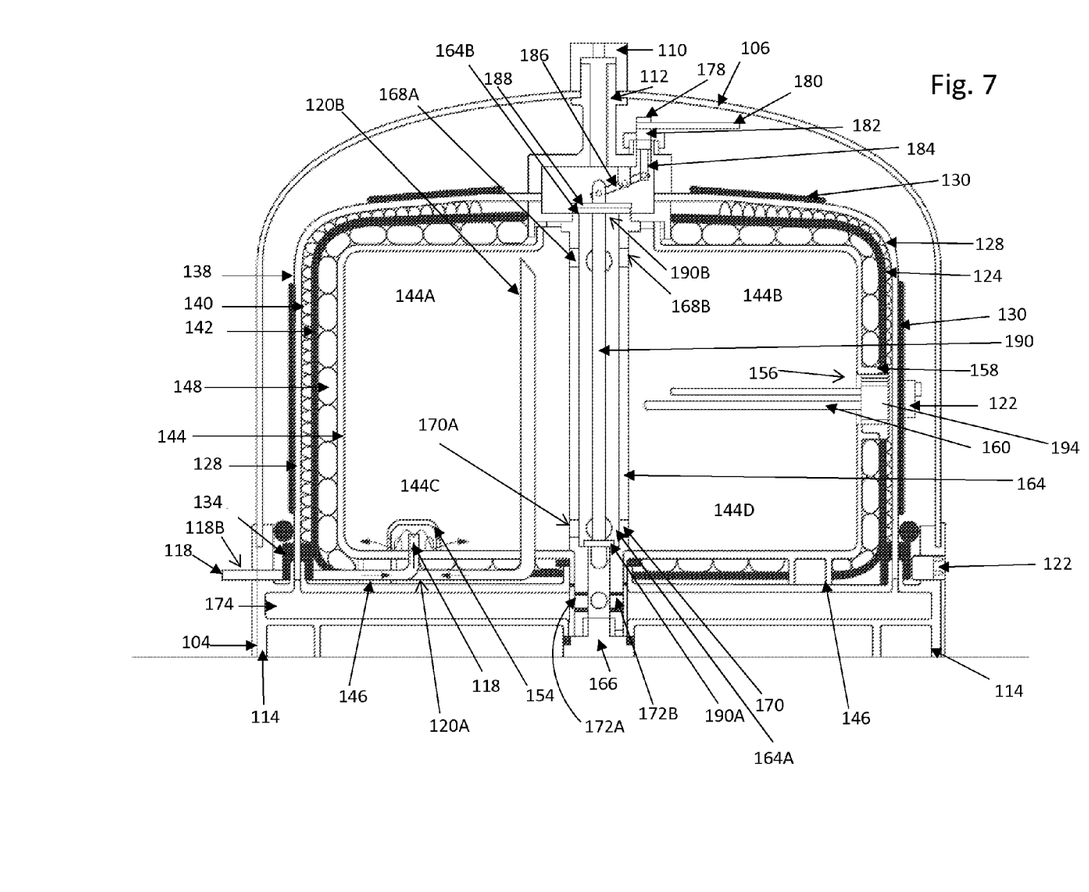
FIG. 7 is a cross-sectional view of the solar preheater of FIG. 3 with a valve in a closed position, in accordance with embodiments of the invention.
Figure 8:
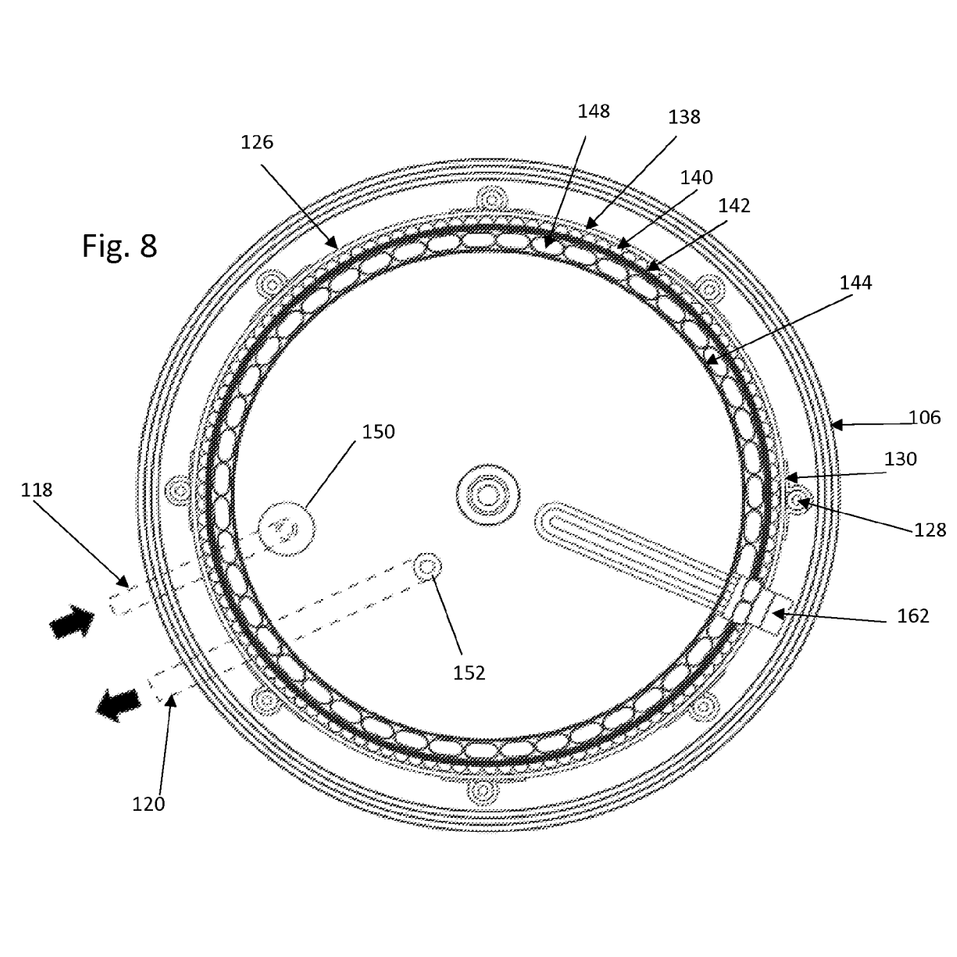
FIG. 8 is a cross-sectional view of the solar preheater of FIG. 2 illustrating embodiments of the invention.

In some embodiments, the solar collection surface 126 comprises a first conductive material layer 138, a second thermal isolating material layer 140, and a third reflective material layer 142, respectively, as shown in FIGS. 7 and 8. In some embodiments, the first layer of conductive material 138, such as an aluminum sheet. In some embodiments, the exterior surface of the first layer of conductive material 138 is painted black. In some embodiments, the second layer of thermal isolating material 140 comprises an air chamber, in which high-density polyethylene bubbles, which are, for example, configured to withstand temperatures of up to 150 degrees Celsius. In some embodiments, the third layer of reflective material 142 is configured to reflect approximately 97 percent of the solar radiation absorbed by the solar preheater 100. In some embodiments, the third layer of reflective material 142 comprises a polished aluminum sheet, preferably a polished pure aluminum sheet.

In some embodiments, when the first layer of conductive material 138 of the solar collection surface 126 reaches a temperature higher than 50 degrees Celsius, the air entrapped within the bubbles of the second layer of thermal isolating material 140 expands. The expansion of the air within the second layer of thermal isolating material 140 allows for the formation of a thermal conductive connection or bridge of the first layer of conductive material 138 with the bottom portion of solar collector tubes 128 and the plurality of ribs 130. The thermal conductive connection enables the conductive transfer of heat within the solar preheater 100 to occur. When the temperature is lower than approximately 50 degrees Celsius, the solar collection surface 126 shrinks and detaches from solar collection tubes 128 and ribs 130, thereby breaking the thermal conductive connection or bridge. This improves isolation of air from outside the solar preheater 100 and thus increases performance.

As shown in FIG. 7, solar preheater 100 includes a storage heater tank 144 configured to store fluid. Storage heater tank 144 is supported over the base 104 by tank supports 146. In some embodiments, the tank 144 is formed of conventional materials. In some embodiments, storage heater tank 144 is made out of thermoplastic to avoid rust and help with minimizing heat losses when subjected to a transmission coefficient that is several folds lower than any metal used in the prior art for making this kind of element. In some embodiments, the storage heater tank 144 is manufactured from a polyurethane injection process.

In some embodiments, a thermal isolating material tank layer 148 is used to isolate storage heater tank 144, as shown in FIG. 7. The thermal isolating material tank layer 148 can be, for example, a polyethylene film in which air bubbles are entrapped. The air bubbles can be 10 mm in height and 20 mm in diameter, for example.

In some embodiments, storage heater tank 144 includes openings 150, 152 (shown in FIG. 8) that are shaped so as to receive the cold fluid inlet tube 118 and the hot fluid outlet tube 120, respectively. The cold fluid inlet tube 118 has a first end 118A and a second end 118B, and the hot fluid outlet tube 120 has a first end 120A and a second end 120B. First end 118A of the cold fluid inlet tube 118 extends through the solar collection surface 126 and past the outer cover 106 of the solar preheater 100. Second end 118B of the cold fluid inlet tube 118 extends through opening 150, curving upwardly, so as to discharge inside a diffuser 154, which is housed in the storage heater tank 144. In some embodiments, the diffuser 154 causes the water entering the storage heater tank 144 to spread toward the inside of a first bottom inner portion 144C of the storage heater tank 144 in a laminar flow to prevent disturbing the fluid in the tank 144. This allows for the gradual upward displacement of the hot fluid in a laminar, sheet-like manner, rather than a turbulent manner.

The first end 120A of the hot fluid outlet tube 120 extends through the solar collection surface 126 and past the outer cover 106 of the solar preheater 100. The second end 120B of the hot fluid outlet tube 120 extends through opening 152, curving upwardly, so as to discharge contents in a first top inner portion 144A of the storage heater tank 144.

Figure 9:
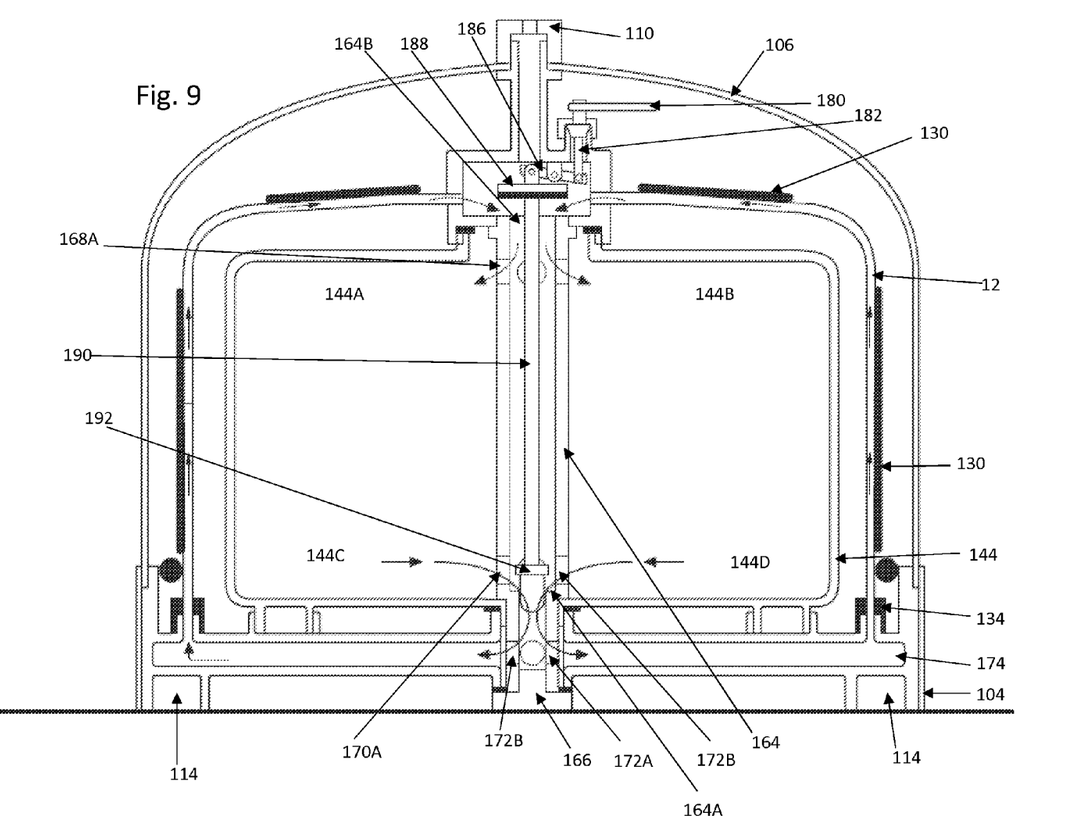
FIG. 9 is a cross-sectional view of the solar preheater of FIG. 3 with the valve in an open position, in accordance with embodiments of the invention.

As shown in FIGS. 7-9, the solar preheater 100 includes a central tube 164 placed inside the storage heater tank 144. Central tube 164 has a first opening 164A operably connected to a base unit 166, which is used to support the solar preheater 100 over the surface that the preheater 100 is placed on. In some embodiments, the central tube 164 further includes a plurality of lower recesses (170A, 170B) and a plurality of upper recesses (168A, 168B), all of the recesses (168A, 168B, 170A, 170B) being located in between the first opening 164A and a second opening 164B of the central tube 164. Each of the plurality of lower recesses 170A, 170B are arranged on the central tube 164 and are configured to allow for fluid transfer from the first bottom inner portion 144C and a second bottom inner portion 144D of the storage heater tank 144 towards the central tube 164, respectively. Each of the plurality of upper recesses (168A, 168B) are arranged on the central tube 164 and are configured to allow for fluid transfer from the central tube 164 towards the first top inner portion 144A and a second top inner portion 144B of the storage tank 144, respectively. As shown in FIG. 7, the central tube 164 has base recesses (172A, 172B) configured to allow for fluid communication between the central tube 164 and the bottom collector tube 174 at the base unit 166.

In some embodiments, the storage heater tank 144 includes an electric heater 156, which can be used to heat the fluid in the tank 144. This feature may be used, for instance, when there is insufficient solar energy to allow the solar preheater 100 to perform satisfactorily on solar radiation alone. In some embodiments, the electric heater 156 includes a housing 158 storing one or more resistive heating elements 160 that are controlled by a resistor controller 162, which is connected to an electric junction 122. In some embodiments, the resistive heating elements 160 have a Teflon® coating for reducing plaque effect that could be formed over the one or more elements 160. In some embodiments, the elements 160 are positioned so that the elements 160 do not adversely heat the walls of the storage heater tank 144 or other components within the tank 144. The placement of the elements 160 within the storage heater tank 144 exhibits these properties, even in the event that the storage heater tank 144 is empty. In an exemplary embodiment, the first 15 cm starting at the base of the one or more resistive heating elements 160 can be covered. In some embodiments, the heater 156 includes a thermostat 194, which allows the user to adjust the temperature of the fluid within the tank 144 through heating by the one or more resistive heating elements 160.

In some embodiments, the solar preheater 100 includes a fastening nut 110 removably attached to the outer cover 106 and supported over a spacer 112, as shown in FIG. 7. In some embodiments, a gasket is provided between the outer cover 106 and the spacer 112 for achieving air-tight seal therebetween. In some embodiments, the spacer 112 is built from a thermally insulative material in order to avoid the formation of a thermally conductive bridge between the storage heater tank 144 and the outer cover 106, to prevent heat loss toward the outside of the outer cover 106. In an alternative embodiment, fastening nut 110 can be attached to a tube that can provide atmospheric balance, such as, for example, an air vessel.

In some embodiments, the solar preheater 100 includes a valve 178 mounted over the spacer 112, central collector 132, and inner portion of central tube 164. FIG. 7 illustrates the valve 178 in a closed position, and FIG. 9 illustrates the valve 178 in an open position. In some embodiments, the valve 178 is a double-seated valve having two seats and two discs arranged so that upstream pressure is acting on one side of one disc and the opposite side on the other disc. In some embodiments, the double-seated valve 178 has a thermal collection surface 180 that extends between the outer cover 106 and the solar collector 124. In some embodiments, the thermal collection surface 180 is attached to a thermal actuator 182, which includes a stage-switch material, such as, but not limited to, paraffin, that expands when there is sufficient solar radiation to operate the solar preheater 100, and contracts when there is insufficient solar radiation to operate the solar preheater 100. The stage-switch material may be selected to transition between the expanded and contracted states at the desired temperature or available solar radiation energy density. In some embodiments, the double-seated valve 178 is placed upside down.

When solar radiation is not sufficient, the thermal actuator 182 causes an actuator plunger 184 to move in a linear direction in response to the contraction of the stage-switch material. The linear movement of the actuator plunger 184 causes a pivoting slave rod 186 to move. The movement of the pivoting slave rod 186, in turn, causes the movement of a first cap plunger 188 that is mounted over the second opening 164B of the central tube 164. In the illustrative embodiment, first cap plunger 188 includes a rod 190 coupled therein. The rod 190 is concentric and runs within the central tube 164. As shown in FIG. 7, a second cap plunger is mounted over of a bottom opening 190A of rod 190.

In some embodiments, the double-seated valve 178 can switch between an open position (shown in FIG. 9) to a closed position (shown in FIG. 7). When in the open position (as shown in FIG. 9), the double-seated valve 178 allows for fluid communication between the solar collector tube 128 and the storage heater tank 144, and for heat received in the solar collector 124 by way of solar radiation to be transmitted to the fluid within the storage heater tank 144. The communication of fluid and the transmission of heat is made possible by the collector tubes 128 and the storage heater tank 144, which act as two hydraulic circuits designed for optimizing the heating of stored fluid, according to the principles of the thermosiphon effect. When a sufficient amount of solar radiation is available during the operation of the solar collector 124, the solar collector 124 is heated. The heat present in the solar collector 124 is then transmitted to the solar collector tubes 128 and to any water stored therein, thereby raising the temperature of the water within the tubes 128. This reduces the density of the water within the tubes relative to that stored in the tank 144. This difference in the densities of the water within the tubes 128 and the tank 144 causes a thermosiphonic flow to be produced through the tubes 128.

The valve 178 switches between the open and closed positions due to the operation of the thermal actuator 182, to either open or close fluid communication between the solar collector tubes 128 and the storage heater tank 144. The thermal actuator 182 is operated based upon the existence or abstinence of a predetermined solar radiation level. For example, when the level of solar radiation reaches an energy density of 250 W/m$^2$, the thermal collection surface 180 transmits enough heat to the thermal actuator 182 so as to cause the stage switch of the stage switch material and the double-seated valve 178 to open, thereby allowing the thermosiphon heating of the water storage in the storage heater tank 144 to begin. When the level of solar radiation has an energy density that is below 150 W/m$^2$, for example, the opposite effect occurs—the thermal actuator 182 closes the double-seated valve 178, thereby avoiding the occurrence of the reverse thermosiphon effect and removing any thermal bridge that could have been formed between the fluid stored in the storage heater tank 144 and the outside. This allows the storage heater tank 144 to act as a thermos, keeping the fluid hot.

It should be noted that the amount and the temperature of the stage switch material are dependent upon a specific radiation energy range and configured so as to provide a fast response to solar radiation energy level. For example, as a baseline, a rainy day has an average radiation of 150 W/m$^2$; a cloudy day—300 W/m$^2$; and a sunny day—750 W/m$^2$. Accordingly, it should be recognized that embodiments of the solar preheater 100 disclosed herein may be used for any kind of usual applications of thermal solar power, as it reaches performances higher than those of flat plate systems used for low temperatures, such as those typically required for hot water in domestic environments. Additionally, embodiments of the solar preheater 100 are configured to allow maximize the thermal collection surface 180. Maximizing the thermal collection surface 180, in turn, is achieved by the use of solar collection mechanisms (124A, 124B) and the configuration of the solar collector tubes 128 and the inner deflectors 176, which configuration is arranged to speed up the occurrence of the thermosiphon effect. Similarly, embodiments of the solar preheater 100 are configured to minimize losses of heat of the fluid stored in the storage heater tank 144 during the times of day when solar radiation is null or low. This configuration is achieved by shrinking the thermal collection surface 180 and the thermal actuator 182 of the double-seated valve 178. Further, according to alternative embodiments, the solar preheater 100 can include a back-up electric heater 156 to maintain a hot fluid flow from the tank 144.

The water heated within the solar collector tubes 128 has a mass m at a distance R from a rotation axis 176A of the inner deflector 176, which is placed inside the second end 128C of the collector tube 128. When the rotation radius of mass m of ΔR is modified, the dynamic movement is null, and the angular moment of the mass m can be maintained. When the mass speed is denoted by V, the maintenance of the angular moment can be shown using the following equations:

$$\Delta L = \Delta(mVR) = m(\Delta VR + V\Delta R) = 0 \quad \text{Equation (1)}$$

$$\Delta V_1 = -V\frac{\Delta R}{R} \quad \text{Equation (2)}$$

The minus sign in Equation 2 indicates that when the radius increases, the tangential rate is reduced. If the mass m moves in a direction that follows a radial path fixed with respect to the rotation system, the same angular rate ω of the rotating system can be maintained and increase the linear rate to $\Delta V_2 = \omega^* \Delta R$. The rate of mass flow across the solar collector tube 128 will increase once the rotation axis 176A generates turbulence in the fluid within the collector tube 128 and the inner deflector 176 reduces the passage section of the fluid. Further, when the inner deflectors 176 are in the top portion of the tube where the water is hotter and thus less dense, the mass flow rate when passing through the inner deflectors 176 is high.

According to some embodiments of the solar preheater 100, the thermal isolating material tank layer 148 of the storage heater tank 144 is not submerged in the fluid. Instead, the thermal isolating material tank layer 148 is placed outside of the storage heater tank 144. Placing the thermal isolating material tank layer 148 outside of the storage heater tank 144 so that the layer is not submerged in fluid causes the tank layer 148 to remain dry and prevent unwanted heat discharge. This maintains the thermal performance of the solar preheater 100 throughout the useful shelf life of the preheater. Placing the thermal isolating material tank layer 148 inside the storage heater thank 144 or submerging the layer in the fluid could cause the isolation tank layer 148 to gradually absorbs humidity from the fluid, which could result in the layer losing isolating properties and causing thermal losses during night-time operation of the preheater 100.

In some embodiments, in addition to the thermal isolating material tank layer 148, the solar preheater 100 includes a solar collection surface 126 having three layers (138, 140, 142). Layers 138 and 142 can be polished pure aluminum layers having a radiation reflectance index of 97 percent and can be arranged to encase an alveolar plastic layer 140 having a thickness of 4 mm, for example. The thermal isolating material tank layer 148 can be made out of polyethylene film that entraps air bubbles of 10 mm in height and 20 mm in diameter. The 20 mm diameter air bubbles create a 20 mm gap in the thermal isolating material tank layer 148, therefore allowing for infrared radiation arising from the storage heater tank 144 to once again be reflected towards the tank layer 148. Any losses that could result from convection and/or radiation of the storage heater tank 144 are minimized due to the air gap, because the air gap forces heat to pass through the gap, which is approximately 99 percent air entrapped within the bubbles of the thermal isolating material tank layer 148. In an exemplary embodiment, isolating layer can be 2.5 cm wide, and as a result of the air gap, the layer can achieve isolation of up to 0.0195 W/mk. Further, the properties that the storage preheater 100 exhibits as a result of the isolation achieved by the air gap configuration include being inert and hydroscopic. Embodiments of the solar preheater 100 disclosed in the present disclosure do not degrade those properties of the preheater, even though humidity could happen and potentially increase with time.

Figure 10:
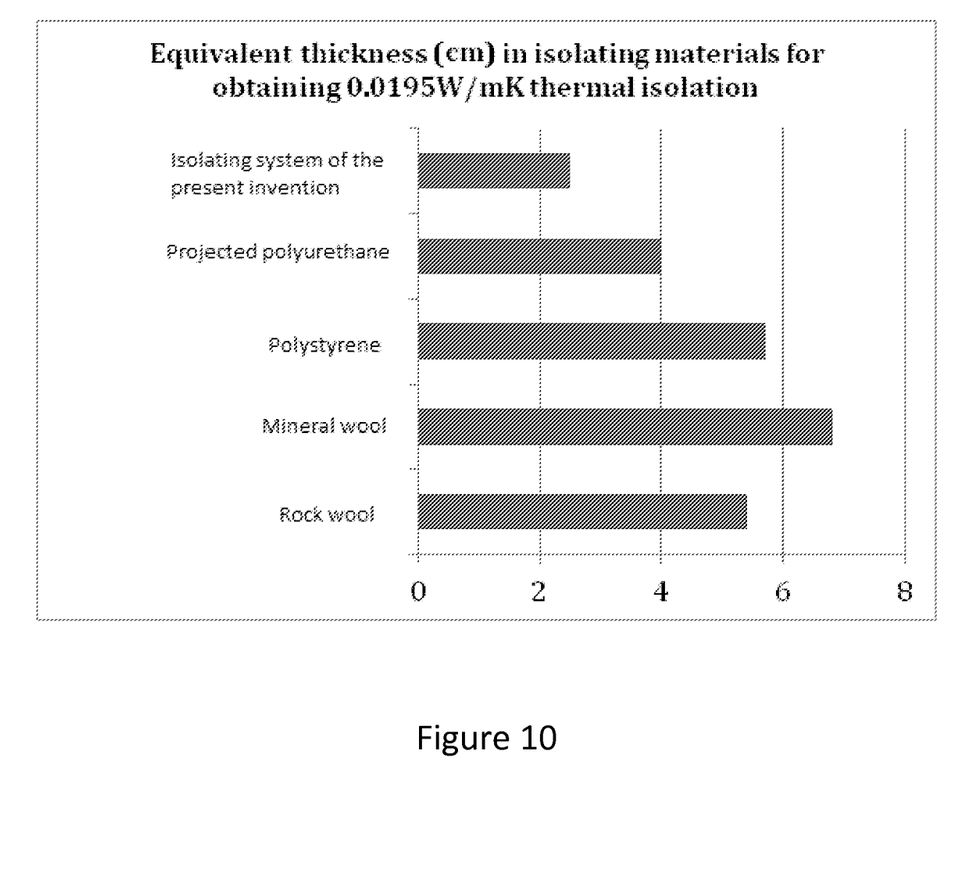
FIG. 10 is a graph that compares known isolations to an isolation suggested in the embodiments of the solar preheater of the present disclosure.

As shown in FIG. 10, the properties exhibited by the preheater 100 were confirmed by tests performed in a lab using Equation 3 below of radiation-transmitted thermal flow:

$$\Phi \nabla \sigma_0 (\epsilon_1 \cdot T_1^4 - \epsilon_2 T_2^4)(1) \quad \text{Equation (3)}$$

In Equation (3), $\epsilon_1 \gamma \epsilon_2$ are the emissivity coefficients; T1 and T2 are the absolute temperatures of the storage heater tank 144 and the thermal isolating material tank layer 148; and $\sigma_0$ is Stefan's constant. FIG. 10 shows, in a comparative manner, the widths equivalent to other known isolation systems needed to achieve the type of isolation described in connection with embodiments of the present disclosure. In particular, FIG. 10 uses the embodiment comprising the thermal isolating material tank layer 148 and the three layers (138, 140, 142) of the solar collection surface 126 to carry out the comparison.

Embodiments of the solar preheater disclosed herein are configured to ease the thermosiphon effect and allow for maximizing the efficiency for heating the fluids flowing through the solar collector 124, while at the same time minimizing the losses of heat of the fluid stored in the storage heater tank 144 during the time of day when sunlight is absent and/or when the weather is cold. Further, embodiments of the solar preheater do not require additional expensive components, such as pumps, photovoltaic cells, etc. Further still, through alternate or combined use of an additional heating back-up source, embodiments of the solar preheater ensures a constant hot water flow desired or expected by the user.

Based on the above disclosure, certain embodiments and details have been described in order to illustrate the present invention, and it will be evident for those skilled in the art that variations and modifications may be made without departing from the scope of the present invention.

What is claimed is:

1. A solar preheater, comprising:
    a central body having a base and an outer cover, wherein the base is arranged to receive the outer cover;
    a storage heater tank having a first top inner portion and a first bottom inner portion;
    a solar collector arranged between the base and the cover, wherein the solar collector comprises a solar collection surface;
    a cold fluid inlet tube having a first end and a second end, wherein the first end extends through the solar collection surface and past the outer cover and the second end extends through an opening and curves upwardly to discharge inside the first bottom inner portion of the storage heater tank;

a hot fluid outlet tube having a first end and a second end, wherein the first end extends through the solar collection surface and past the outer cover, and the second end extends through an opening and curves upwardly to discharge inside the first top inner portion of the storage heater tank;

a storage heater tank arranged between the solar collector and the base and configured to receive the cold fluid inlet tube in a bottom portion and the hot fluid outlet tube in a top portion;

a first thermal collection mechanism and a second thermal collection mechanism comprising:

a plurality of solar collector tubes, wherein each of the plurality of solar collector tubes comprises a first end removably attached to the base, a body that runs alongside the solar collection surface, and a second end removably attached to a central collector;

a plurality of solar collector ribs, wherein each of the plurality of solar collector ribs is configured to latch onto each solar collector tube, wherein the first thermal collection mechanism is operated by heat transmitted directly from the plurality of solar collector ribs; and wherein the second thermal collection mechanism is operated by expanding and contracting the solar collection surface as each of the plurality of solar collector ribs forms or breaks contact with the solar collection surface; and a central tube placed inside the storage heater tank, wherein the central tube comprises a first opening operably connected to a base unit used to support the solar preheater over a surface that the solar preheater is placed on, wherein the central tube includes a plurality of lower recesses and a plurality of upper recesses configured to allow for fluid transfer.

2. The solar preheater of claim 1, further comprising a spacer comprising a non-conductive material to avoid formation of a thermal bridge between the storage heater tank and the outer cover.

3. The solar preheater of claim 1, further comprising a valve mounted over the central collector and configured to switch from an open position, allowing for fluid communication between each solar collector tube and the storage heater tank, to a closed position, foreclosing fluid communication between each solar collector tube and the storage heater tank.

4. The solar preheater of claim 3, further comprising a thermal actuator arranged to move the valve from the open to the closed position.

5. The solar preheater of claim 1, wherein the solar collection surface comprises a first conductive material layer.

6. The solar preheater of claim 5, wherein the solar collection surface comprises a second thermal isolating material layer.

7. The solar preheater of claim 6, wherein the solar collection surface comprises a third reflective material layer.

8. The solar preheater of claim 7, further comprising a thermal isolating material tank layer used to isolate the storage heater tank.

9. The solar preheater of claim 1, further comprising a diffuser housed in the storage heater tank and configured to receive discharge of contents from the second end of the cold fluid inlet tube.

10. A solar preheater, comprising:

a central body having a base and an outer cover, wherein the base is arranged to receive the outer cover;

a storage heater tank having a first top inner portion and a first bottom inner portion;

a solar collector arranged between the base and the cover, wherein the solar collector comprises a solar collection surface, the solar collection surface comprising a central tube configured to support the solar preheater, wherein the central tube comprises a first opening operably connected to a base unit used to support the solar preheater over a surface that the solar preheater is placed on, wherein the central tube includes a plurality of lower recesses and a plurality of upper recesses configured to allow for fluid transfer;

a cold fluid inlet tube having a first end and a second end, wherein the first end extends through the solar collection surface and past the outer cover and the second end extends through an opening and curves upwardly to discharge inside the first bottom inner portion of the storage heater tank;

a hot fluid outlet tube having a first end and a second end, wherein the first end extends through the solar collection surface and past the outer cover, and the second end extends through an opening and curves upwardly to discharge inside the first top inner portion of the storage heater tank;

a storage heater tank arranged between the solar collector and the base and configured to receive the cold fluid inlet tube in a bottom portion and the hot fluid outlet tube in a top portion;

a first thermal collection mechanism and a second thermal collection mechanism comprising:

a plurality of solar collector tubes, wherein each of the plurality of solar collector tubes comprises a first end removably attached to the base, a body that runs alongside the solar collection surface, and a second end removably attached to a central collector;

a plurality of solar collector ribs, wherein each of the plurality of solar collector ribs is configured to latch onto each solar collector tube, wherein the first thermal collection mechanism is operated by heat obtained transmitted directly from the plurality of solar collector ribs;

wherein the second thermal collection mechanism is operated by expanding and contracting the solar collection surface as each of the plurality of solar collector ribs forms or breaks contact with the solar collection surface; and an electric heater comprising a housing and one or more resistive heating elements, the heater configured to heat fluid stored in the storage heating tank.

11. The solar preheater of claim 10, wherein the electric resistor comprises coating for reducing plaque formed over the electric resistor and for allowing the solar preheater to be operated autonomously.

12. A method of using a solar preheater to receive solar radiation, comprising:

using a plurality of ribs to transmit heat toward a top portion of a collector tube;

expanding a solar collection surface to contact a bottom portion of the collector tube;

moving a thermal actuator using a thermal collection surface; and opening a double-seated valve configured to allow fluid communication between the collector tube and a storage heater tank.

* * * * *